(12) United States Patent
Hara et al.

(10) Patent No.: US 8,882,130 B2
(45) Date of Patent: Nov. 11, 2014

(54) BICYCLE DRIVE ASSEMBLY

(71) Applicants: Nobukatsu Hara, Osaka (JP); Michihiro Kodama, Osaka (JP)

(72) Inventors: Nobukatsu Hara, Osaka (JP); Michihiro Kodama, Osaka (JP)

(73) Assignee: Shimano Inc., Osaka (JP)

( * ) Notice: Subject to any disclaimer, the term of this patent is extended or adjusted under 35 U.S.C. 154(b) by 65 days.

(21) Appl. No.: 13/649,721

(22) Filed: Oct. 11, 2012

(65) Prior Publication Data
US 2014/0102822 A1  Apr. 17, 2014

(51) Int. Cl.
*B62J 13/00* (2006.01)

(52) U.S. Cl.
USPC .................. 280/304.3; 280/288.4; 180/206.1; 180/206.7

(58) Field of Classification Search
CPC ............ B62M 6/70; B62M 6/60; B62M 6/55; B62M 6/40
USPC ................. 180/206.1, 206.7; 280/200, 288.4, 280/304.3
See application file for complete search history.

(56) References Cited

U.S. PATENT DOCUMENTS

| | | | |
|---|---|---|---|
| 3,927,736 A * | 12/1975 | Bergles ............................ | 188/26 |
| 4,230,212 A * | 10/1980 | Tsuchie et al. .................. | 192/64 |
| 4,278,265 A * | 7/1981 | Nagano ...................... | 280/160.1 |
| 5,492,392 A * | 2/1996 | Chen ........................... | 301/37.41 |
| 6,102,421 A * | 8/2000 | Lawwill et al. ................ | 280/284 |
| 6,836,037 B1 * | 12/2004 | Tsuboi ......................... | 310/68 R |
| 6,964,313 B2 | 11/2005 | Phillips, III et al. | |
| 7,066,856 B1 * | 6/2006 | Rogers .......................... | 474/144 |
| 7,150,337 B2 | 12/2006 | Phillips, III et al. | |
| 7,793,960 B2 * | 9/2010 | Sherman ...................... | 280/288 |
| 7,874,955 B2 * | 1/2011 | Patterson ..................... | 475/259 |
| 8,033,945 B2 * | 10/2011 | Patterson ..................... | 475/259 |
| 8,162,344 B2 * | 4/2012 | Hoogendoorn ............... | 280/284 |
| 2002/0038944 A1 * | 4/2002 | Lawwill et al. ................ | 280/284 |
| 2008/0289927 A1 * | 11/2008 | Ji .................................... | 192/64 |
| 2009/0008987 A1 * | 1/2009 | Hoogendoorn ............. | 301/110.5 |
| 2009/0058038 A1 * | 3/2009 | Dodman et al. .............. | 280/274 |
| 2009/0088284 A1 * | 4/2009 | Patterson ..................... | 475/213 |
| 2011/0115189 A1 * | 5/2011 | Patterson ..................... | 280/238 |
| 2012/0200146 A1 * | 8/2012 | Hoogendoorn ............. | 301/110.5 |

FOREIGN PATENT DOCUMENTS

| | | |
|---|---|---|
| JP | 62-191591 U | 12/1987 |
| TW | M290853 U | 5/2006 |

* cited by examiner

*Primary Examiner* — Kevin Hurley
*Assistant Examiner* — Michael Stabley
(74) *Attorney, Agent, or Firm* — Global IP Counselors

(57) ABSTRACT

A bicycle drive assembly includes a rear hub and a cover. The rear hub includes a rear hub axle, a hub shell, a first rear sprocket and a disc brake rotor. The hub shell is rotatably mounted on the rear hub axle. The first rear sprocket is rotatably mounted on a first side of the rear hub axle. The disc brake rotor is rotatably mounted on the first side of the rear hub axle. The cover is disposed around the rear hub axle and axially between the first rear sprocket and the disc brake rotor.

13 Claims, 6 Drawing Sheets

BICYCLE DRIVE ASSEMBLY

BACKGROUND

1. Field of the Invention

This invention generally relates to a bicycle drive assembly. More specifically, the present invention relates to a bicycle drive assembly having a rear hub.

2. Background Information

In recent years, some bicycles have been provided with a power assist to aid in providing a drive force. In a power assist, a motor provides a supplemental drive force to a pedaling force to aid the rider. One example of such a power assist bicycle is disclosed in U.S. Pat. No. 6,964,313 (assigned to Biketoo, Inc.). With such a power assist bicycle, the rear hub is provided with sprockets at each axial end of the hub and a pair of chain drives are connected to the sprockets for driving the rear wheel with either the motor or by the rider's pedaling force.

Some bicycles have been provided with disc brakes to aid in stopping the bicycle. Disc brake systems provide a substantial braking power in relationship to the amount of braking force applied to a brake lever. Also, disc brake systems typically provide a high level of consistency in all types of weather and riding conditions.

SUMMARY

It has been found that when a rear disc brake system is added to a bicycle having a chain drive, the dirt, oil, chain grease or the like from the chain can adhere to the brake rotor when the chain drive and the brake rotor are on the same axial end of the bicycle hub. In such a power assist bicycle, it has been discovered that, for excellent brake performance, the brake rotor needs to be adequately protected from dirt, oil, chain grease or the like.

Generally, the present disclosure is directed to various features of a bicycle drive assembly that is provided with a rear hub that has a brake rotor.

In accordance with one aspect of the present disclosure, a bicycle drive assembly includes a rear hub and a cover. The rear hub includes a rear hub axle, a hub shell, a first rear sprocket and a disc brake rotor. The hub shell is rotatably mounted on the rear hub axle. The first rear sprocket is rotatably mounted on a first side of the rear hub axle. The disc brake rotor is rotatably mounted on the first side of the rear hub axle. The cover is disposed around the rear hub axle and axially between the first rear sprocket and the disc brake rotor.

Other objects, features, aspects and advantages of the disclosed bicycle drive assembly will become apparent to those skilled in the art from the following detailed description, which, taken in conjunction with the annexed drawings, discloses a preferred embodiment.

BRIEF DESCRIPTION OF THE DRAWINGS

Referring now to the attached drawings which form a part of this original disclosure.

DETAILED DESCRIPTION OF EMBODIMENTS

A preferred embodiment will now be explained with reference to the drawings. It will be apparent to those skilled in the art from this disclosure that the following descriptions of the embodiment are provided for illustration only and not for the purpose of limiting the invention as defined by the appended claims and their equivalents.

Figure 1:
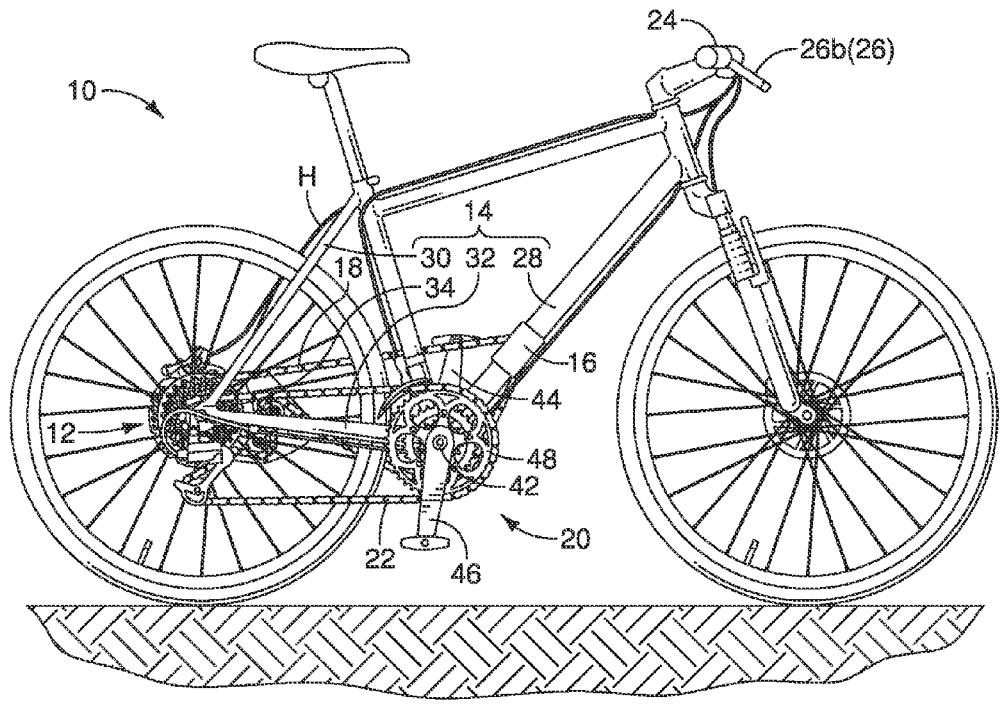
FIG. 1 is a right side elevational view of an electric assist power bicycle that is equipped with a bicycle drive assembly in accordance with one embodiment.
Figure 2:
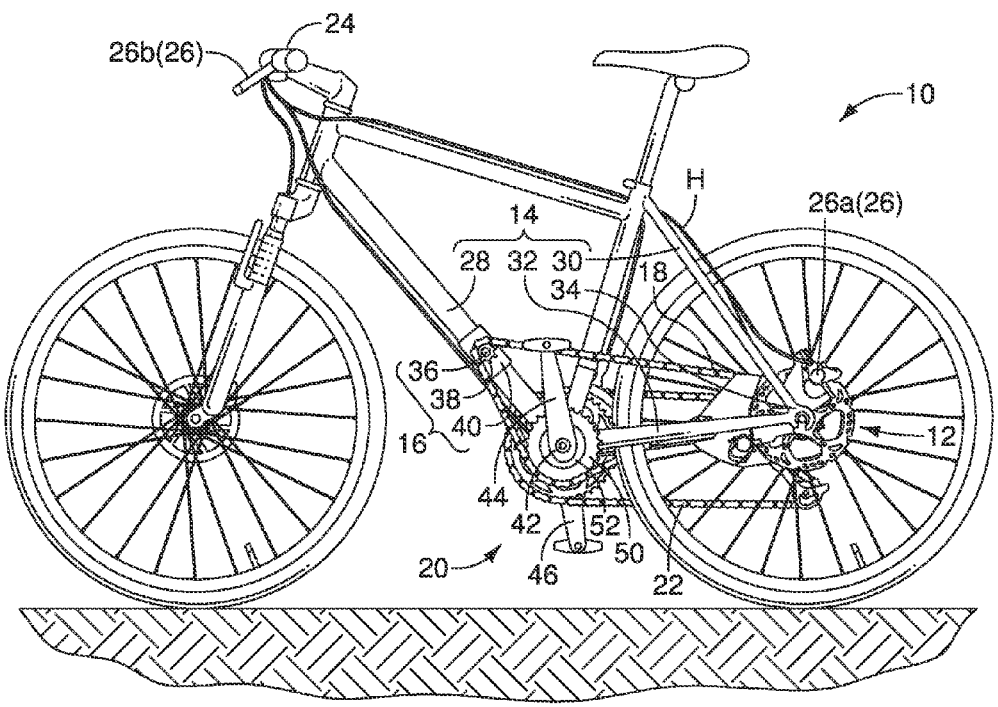
FIG. 2 is a left side elevational view of the electric assist bicycle that is equipped with the bicycle drive assembly in accordance with one embodiment.

Referring initially to FIGS. 1 and 2, a bicycle 10 with a bicycle drive assembly 12 is illustrated. The bicycle 10 is an electric power assist bicycle that is driven by a manual power only, a motor power only or a combination of the manual power and the motor power. The bicycle 10 basically includes a bicycle frame 14, a motor 16, a first driving member 18, a front crankset 20 and a second driving member 22. The bicycle 10 further includes a bicycle handlebar 24 and a rear disc brake system 26. The rear disc brake system 26 includes a bicycle disc brake caliper 26a and a brake operating (actuating) mechanism 26b. The brake operating mechanism 261) is attached to the bicycle handlebar 24, and is operably connected to the bicycle disc brake caliper 26a by a hydraulic line H, which will be discussed later. Of course, the bicycle 10 also preferably further includes various conventional components or parts, such as a saddle, a pair of shifters, a pair of derailleurs, etc. These conventional components or parts of the bicycle 10 will not be discussed or illustrated in detail herein. It will be apparent to those skilled in the bicycle art from this disclosure that various modifications can be made to the various conventional components or parts of the bicycle 10 without departing from the scope of the present invention. In the following explanations, the terms "left" and "right" will be used from the perspective of viewing the bicycle 10 from the rear side in FIGS. 1 and 2.

The bicycle frame 14 includes a main frame body 28, a rear fork 30 and a chain stay 32. The chain stay 32 is linked to a rear end portion of the rear fork 30 via a rear end 34. The bicycle frame 14 includes a well-known structure, and thus, it will not be discussed and/or illustrated in detail herein.

The motor 16 is an electric motor that is coupled to the main frame body 28. As shown in FIG. 2, the motor 16 basically includes an output shaft 36, a drive sprocket 38 that is mounted on the output shaft 36 and a motor unit housing 40. The output shaft 36 is located on a first (left) lateral side of the main frame body 28 of the bicycle frame 14. In particular, the output shaft 36 is rotatably mounted to the motor unit housing 40 that is coupled to the main frame body 28. The output shaft 36 projects out of a first (left) side of the motor unit housing 40 so that the output shaft 36 rotates about a rotation axis relative to the motor unit housing 40. The output shaft 36 is operatively coupled between an internal motor structure (not shown) in the motor unit housing 40 and the drive sprocket 38. When the internal motor structure electrically rotates the output shaft 36, the drive sprocket 38 rotates together with the output shaft 36 about the rotation axis to move the first driving member 18. The drive sprocket 38 is a chain sprocket that has a plurality of chain engagement teeth for engaging the first driving member 118. It will be apparent to those skilled in the art from this disclosure that the motor 16 could be modified to a fuel-powered motor such as a gasoline fuel-powered motor. Also, the output shaft 36 can be modified to be located on a second (right) lateral side of the main frame body 28 of the bicycle frame 14 if needed and/or desired.

The first driving member 18 operatively couples the drive sprocket 38 and a first rear sprocket 64 (FIG. 4) of the bicycle drive assembly 12 together on the first (left) lateral side of the bicycle frame 14. The first driving member 18 is driven by the motor 16 to drive the first rear sprocket 64. In the illustrated embodiment, the first driving member 18 is a chain formed of metallic material. As will be discussed later, the first driving member 18 further couples a pulley 50 of the front crankset 20 and a tensioner 58 of the bicycle drive assembly 12. The first driving member 118, the drive sprocket 38, the first rear sprocket 64, the pulley 50 and the tensioner 58 form a motor drive train.

The front crankset 20 includes a crank axle 42, a first (left) crank arm 44, a second (right) crank arm 46 and a front sprocket (e.g., a second drive sprocket) 48. The crank axle 42 is rotatably mounted to the bicycle frame 14. The first crank arm 44 and the second crank arm 46 are mounted on opposite ends of the crank axle 42. The front sprocket 48 is fixedly coupled to the crank axle 42 on the second (right) lateral side of the bicycle frame 14. The front sprocket 48 is a chain sprocket that has a plurality of chain engagement teeth for engaging the second driving member 22. Since the crank axle 42, the first crank arm 44 and the second crank arm. 46 are relatively conventional components, these components will not be described and/or illustrated in detail herein. In the illustrated embodiment, the front crankset 20 includes three front sprockets as the front sprocket 48 as shown in FIG. 1. However, it will be apparent to those skilled in the bicycle field that the front crankset 20 can be configured with only one sprocket or two sprockets if needed and/or desired.

The front crankset 20 further includes the pulley 50 and a crank bearing 52 on the first (left) lateral side of the bicycle frame 14. In particular, the pulley 50 is supported on the crank axle 42 by the crank bearing 52 so that the pulley 50 rotates independently of rotation of the second crank arm 46. The pulley 50 has a plurality of chain engagement teeth for engaging the first driving member 18. The pulley 50 is engaged with the first driving member 18 to guide the first driving member 18 between the drive sprocket 38 and the first rear sprocket 64 (FIG. 4) of the bicycle drive assembly 12.

As best shown in FIG. 1, the second driving member 22 operatively couples the front sprocket 48 and a second rear sprocket 66 (FIG. 3) of the bicycle drive assembly 12 together on the second (right) lateral side of the bicycle frame 14 in a conventional manner. The second driving member 22, the front sprocket 48 and the second rear sprocket 66 form a manual drive train. In the illustrated embodiment, the second driving member 22 is a chain formed of metallic material.

As discussed above, the bicycle 10 is driven by the manual power and/or the motor power. In particular, the bicycle 10 is driven manually with the second driving member 22 disposed on the second (right) lateral side of the bicycle frame 14. The second driving member 22 transfers a manual pedaling force applied through the front crankset 20 by the rider to a rear hub 54 (FIG. 3) of the bicycle drive assembly 12 in a conventional manner. The bicycle 10 is also driven by the motor power with the first driving member 18 disposed on the first (left) lateral side of the bicycle frame 14. The first driving member 18 transfers the motor power applied by the motor 16 to the rear hub 54 (FIG. 3) in a conventional manner. Therefore, the bicycle 10 can be easily driven by using the manual power only, or by using the motor 16 only. Moreover, it would be apparent to one of ordinary skill in the art that the bicycle 10 is driven by a combination of the manual power and the motor power so that the motor 16 assists the manual pedaling force applied by the rider.

Referring now to FIGS. 3 to 10, the bicycle drive assembly 12 will now be explained in detail. As used herein to describe the parts of the bicycle drive assembly 12, the following directional terms "left" and "right", "inside", "outside" "inner", "outer", "above" and "below" as well as any other similar directional terms refer to those directions relative to the bicycle drive assembly 12 in an installed position on the bicycle 10 that is upright on a horizontal surface.

Basically, as seen in FIGS. 3 to 7, the bicycle drive assembly 12 has the rear hub 54, a cover 56 and the tensioner 58. The rear hub 54 includes a rear hub axle 60, a hub shell 62, a first rear sprocket 64, the second rear sprocket 66, and a disc brake rotor 68.

Figure 3:
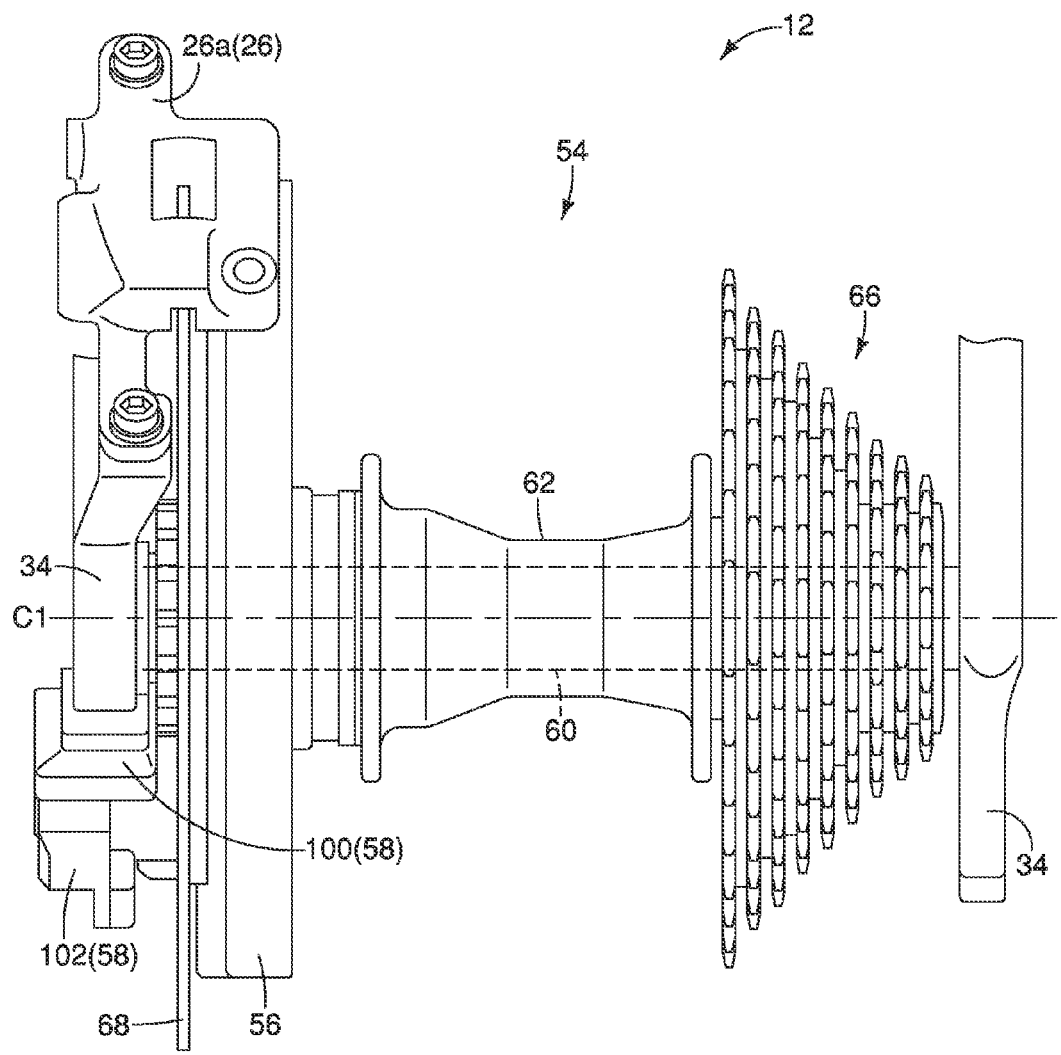
FIG. 3 is a rear elevational view of the bicycle drive assembly coupled to a bicycle frame of the electric power assist bicycle illustrated in FIGS. 1 and 2, with a disc brake caliper mounted to the bicycle frame.
Figure 4:
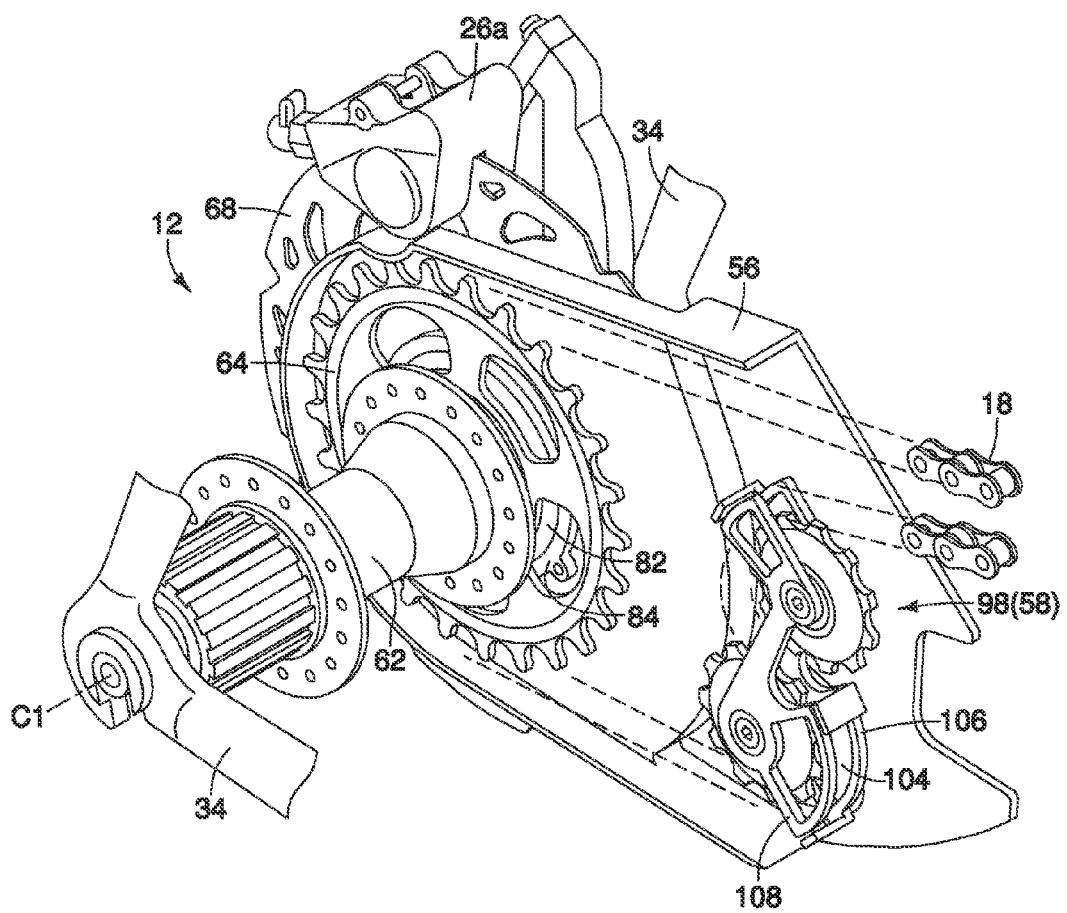
FIG. 4 is a partial inside or right side perspective view of the bicycle drive assembly illustrated in FIG. 3, with a second sprocket removed from the bicycle drive assembly.

As shown in FIGS. 3 and 4, the rear hub axle 60 is fastened to the rear end 34 of the bicycle frame 14. The rear hub axle 60 includes a center longitudinal axis that defines a first center rotational axis C1 of the hub shell 62. The first center rotational axis C1 is also a center rotational axis of the first rear sprocket 64, the second rear sprocket 66 and the disc brake rotor 68.

The hub shell 62 is rotatably mounted on the rear hub axle 60. In particular, the hub shell 62 is arranged over the outside circumference of the rear hub axle 60 so as to rotate freely around rear hub axle 60. The hub shell 62 constitutes a driven member that receives the manual power and the motor power as a driving torque or force from the first driving member 18 and the second driving member 22 via the first rear sprocket 64 and the second rear sprocket 66, respectively.

Figure 5:
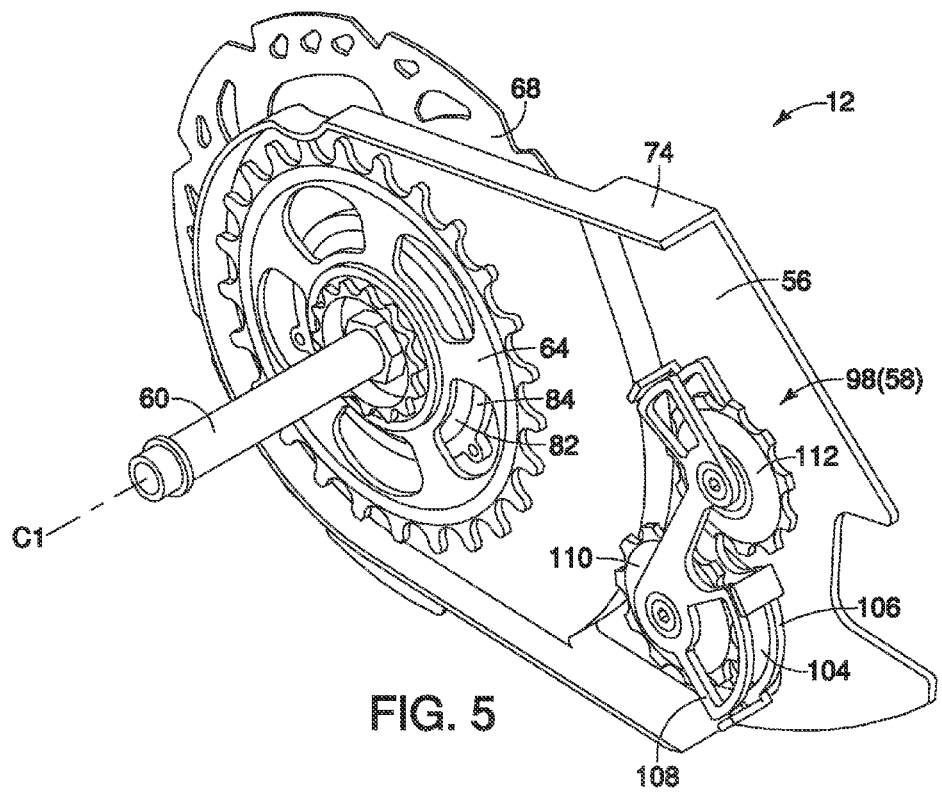
FIG. 5 is a partial inside or right side perspective view of the bicycle drive assembly illustrated in FIG. 3, illustrating a first rear sprocket, a cover and a disc brake rotor disposed around a rear hub axle.
Figure 6:
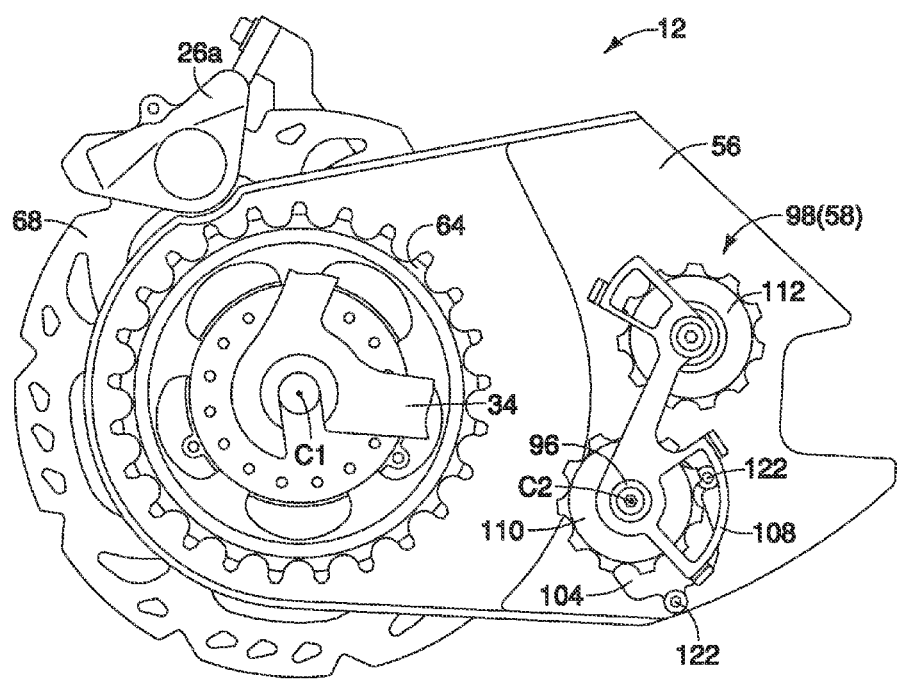
FIG. 6 is a partial inside or right side elevational view of the bicycle drive assembly illustrated in FIG. 4, with a first driving member and a second driving member removed from the bicycle drive assembly.

As shown in FIGS. 4 to 6, the first rear sprocket 64 is rotatably mounted on a first (left) side of the rear hub axle 60. The first rear sprocket 64 is a chain sprocket that has a plurality of chain engagement teeth for engaging the first driving member 18. As discussed above, the first driving member 18 is disposed on the first rear sprocket 64 such that motor power applied by the motor 16 is transferred through the first rear sprocket 64 to the hub shell 62.

As shown in FIG. 3, the second rear sprocket 66 is rotatably mounted on a second (right) side of the rear hub axle 60. The second rear sprocket 66 is a multiple sprocket, which is equipped with a plurality of sprocket gears. The second driving member 22 is disposed so as to selectively engage one of the gears of the second rear sprocket 66. The second rear sprocket 66 is a chain sprocket that has a plurality of chain engagement teeth for engaging the second driving member 22 (FIGS. 1 and 2). As discussed above, the second driving member 22 is disposed on the second rear sprocket 66 in a conventional manner such that the manual pedaling force applied by the rider is transferred through the second rear sprocket 66 to the hub shell 62.

Figure 7:
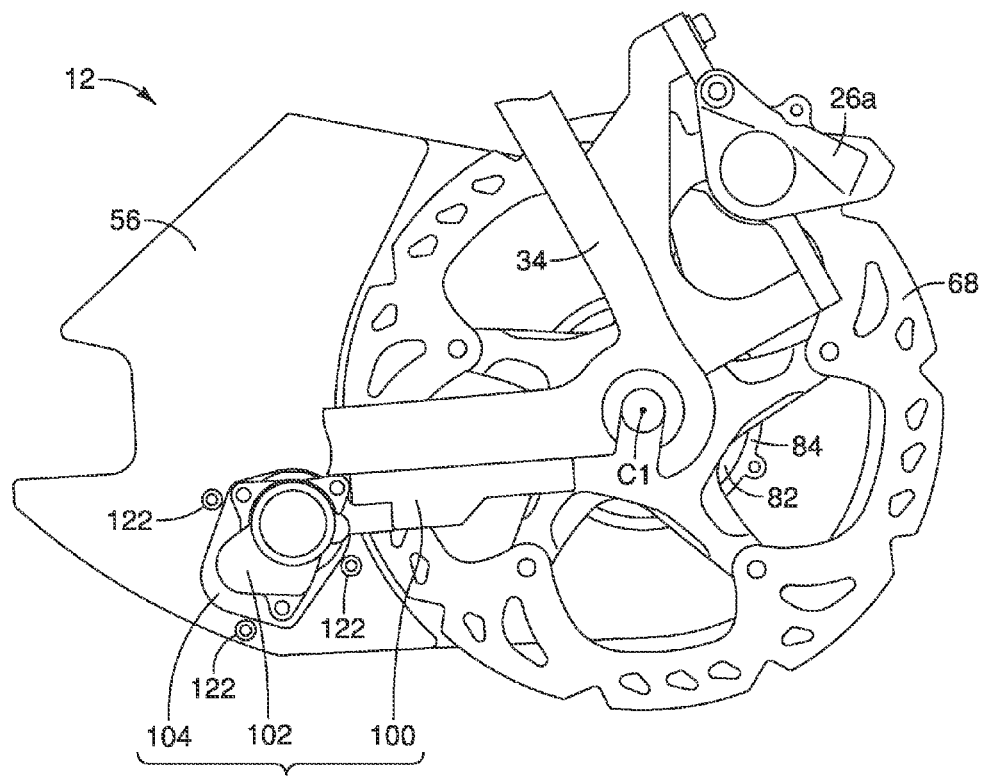
FIG. 7 is a partial outside or left side elevational view of the bicycle drive assembly illustrated in FIG. 4.

As shown in FIGS. 3, 4 and 7, the disc brake rotor 68 is rotatably mounted on the first (left) side of the rear hub axle 60. The disc brake rotor 68 is configured to rotate with the hub shell 62 and be applied a forcible gripping action on by the rear disc brake system 26 in a conventional manner. As mainly shown in FIG. 7, the bicycle disc brake caliper 26a is fixedly attached to the rear end 34, and constructed for selectively gripping (stopping rotation) of the disc brake rotor 68 to stop or slow the rotation of the hub shell 62.

Referring now to FIGS. 4 to 9, the cover 56 will now be discussed. As best shown in FIG. 4, the cover 56 is disposed around the rear hub axle 60 and axially between the first rear sprocket 64 and the disc brake rotor 68. Moreover, the cover 56 is non-rotatably supported on the bicycle frame 14, which will be discussed later in detail.

Figure 8:
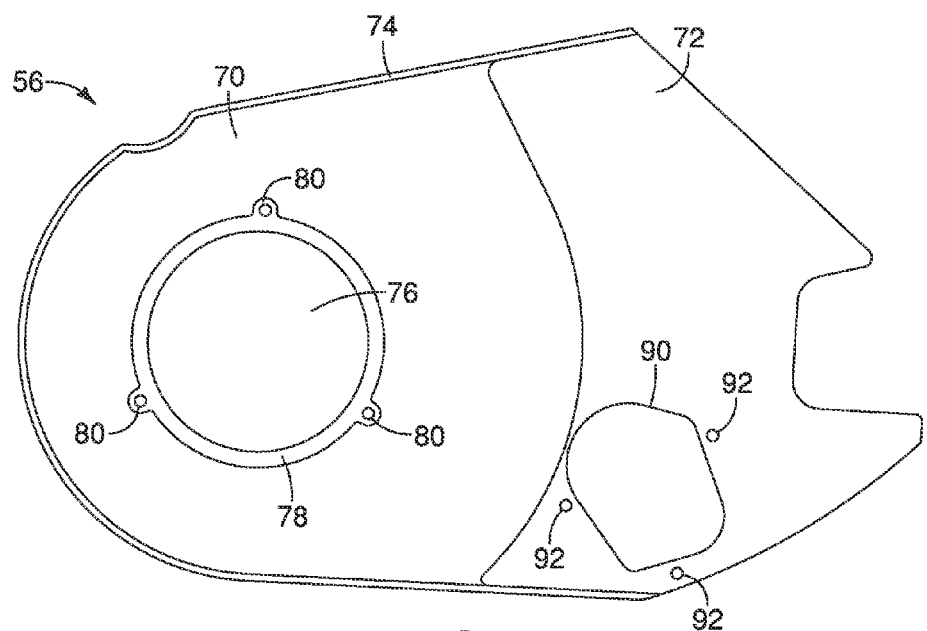
FIG. 8 is an inside or right side elevational view of the cover of the bicycle drive assembly illustrated in FIGS. 1 to 7.
Figure 9:
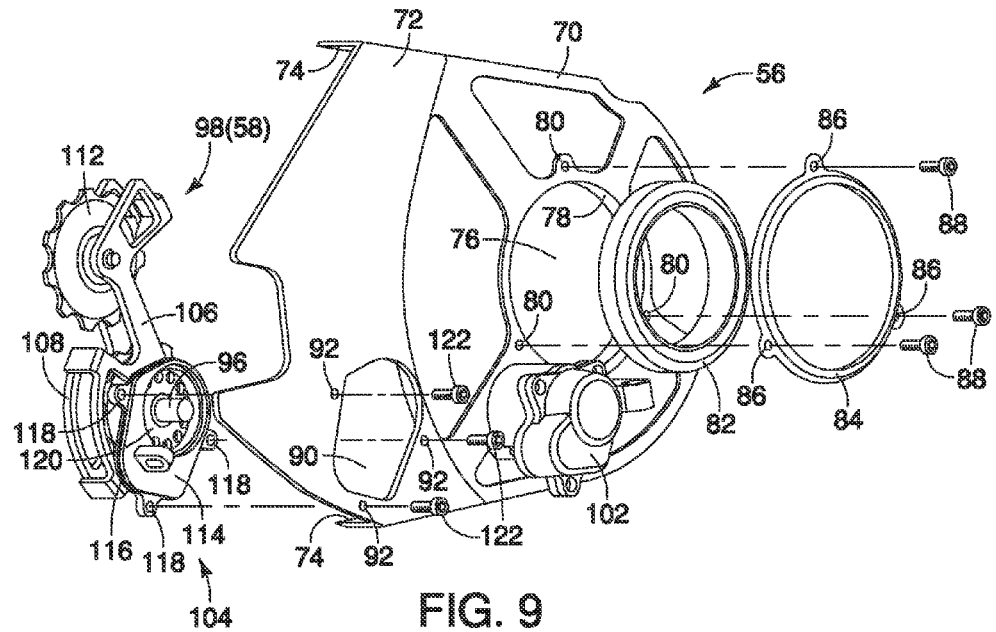
FIG. 9 is an exploded partial perspective view of the bicycle drive assembly illustrated in FIGS. 3 to 7, illustrating the cover with a bearing and a part of tensioner mounted thereto.

As shown in FIGS. 8 and 9, the cover 56 is constructed as a one-piece, unitary member from a suitable rigid material to cover the first rear sprocket 64. The material is preferably lightweight material such as a non-metallic material, a plastic material or other suitable materials. Of course, the cover 56 could be made of a metallic material as needed and/or desired.

The cover 56 basically includes a rear sprocket covering portion 70, a tensioner covering portion 72 and an outer peripheral portion 74. The rear sprocket covering portion 70 is a rear portion of the cover 56. The rear sprocket covering portion 70 has a rear hub axle opening 76. The rear hub axle opening 76 has a circular shape for receiving the rear hub axle 60 and the hub shell 62 therein. The rear sprocket covering portion 70 further includes a bearing holder 78, and a plurality (three) of first bores 80. A bearing 82 is attached to the rear sprocket covering portion 70 of the cover 56 by a bearing housing 84 having three screw bores 86 that receive three first screws 88 therethrough. The first screws 88 are screwed into the first bores 80 to securely attach the bearing 82 to the cover 56. Alternatively, the bearing 82 could be merely press-fitted into the bearing holder 78 as needed and/or desired. In any case, the bearing 82 is provided between the cover 56 and the rear hub axle 60 such that the connection of the hub shell 62 to the disc brake rotor 68 can rotate within the rear hub axle opening 76 while the cover 56 and the rear hub axle 60 remain stationary.

The bearing holder 78 is dimensioned to hold the bearing 82 in the rear hub axle opening 76. In particular, the bearing holder 78 projects inward from an outside of the rear sprocket covering portion 70 along an edge of the rear hub axle opening 76. In other words, the bearing holder 78 defines the rear hub axle opening 76.

The bearing 82 is fitted into the bearing holder 78. The bearing housing 84 is coupled to the cover 56 from the outside, with the bearing 82 held in the rear hub axle opening 76. In particular, the first screws 88 extend through the housing bores 86 formed on a bearing housing 84, respectively, and are threadedly coupled to the first bores 80 disposed around the rear hub axle opening 76, respectively. As shown in FIG. 5, in the engagement position of the bicycle drive assembly 12, the cover 56 is supported on the rear hub axle 60 by the bearing 82. Thus, this arrangement allows free rotation of the hub shell 62 relative to the cover 56, and the cover 56 is not subjected to the rotation of the hub shell 62.

Referring back to FIGS. 8 and 9, the tensioner covering portion 72 of the cover 56 is a front portion of the cover 56. The tensioner covering portion 72 has a pulley axle opening 90 (e.g., an opening in the cover) for receiving a support axle 96 of the tensioner 58 therein. The pulley axle opening 90 is dimensioned and shaped to be fit by a second tensioner housing 104 of the frame mounting portion 94 of the tensioner 58. The tensioner covering portion 72 further includes three second bores 92 so that the tensioner 58 is coupled to the tensioner covering portion 72, which will be discussed later. The pulley axle opening 90 is arranged to be spaced apart from the rear hub axle opening 76 so that the first rear sprocket 64 and the tensioner 58 do not contact each other and so that an engaging part 98 of the tensioner 58 guides the first driving member 18 properly.

The outer peripheral portion 74 projects inward from an outer edge of the rear sprocket covering portion 70 and an outer edge of a part of the tensioner covering portion 72. As shown in FIG. 5, in the engagement position of the bicycle drive assembly 12, the outer peripheral portion 74 partially covers the first rear sprocket 64 and the tensioner 58 from the upside, the downside and the rear side thereof.

As explained above, the cover 56 is disposed around the rear hub axle 60 and axially between the first rear sprocket 64 and the disc brake rotor 68. With this arrangement, the cover 56 covers the first rear sprocket 64 that engages the first driving member 18. Accordingly, the cover 56 can prevent lubricant oil that is supplied to the first driving member 18 from adhering on the disc brake rotor 68 while the first rear sprocket 64 is driven. The lubricant oil on the disc brake rotor 68 can cause decreased brake performance. However, in this illustrated embodiment, although the disc brake rotor 68 is disposed close to the first rear sprocket 64 on the first (left) side of the rear hub axle 60, the cover 56 is disposed around the rear hub axle 60 and axially between the first rear sprocket 64 and the disc brake rotor 68 to cover the first rear sprocket 64. Accordingly, the cover 56 can protect the disc brake rotor 68 from the lubricant oil scattered from the first rear sprocket 64, which allows the bicycle drive assembly 12 to prevent the brake performance from decreasing.

Referring to FIGS. 3 to 7, 9 and 10, the tensioner 58 will now be explained. As best shown in FIG. 3, the tensioner 58 is disposed on the first (left) side of the rear hub axle 60. Moreover, as best shown in FIG. 4, the tensioner 58 is disposed forward from the first rear sprocket 64 so that the first driving member 18 is tensioned in order to keep the first driving member 18 engaged with the first rear sprocket 64. The tensioner 58 has a frame mounting part 94, the support axle 96 and the engaging part 98.

As best shown in FIG. 7, the frame mounting part 94 is configured to be fixed to the rear end 34. In particular, the frame mounting part 94 preferably includes a bracket 100, a first tensioner housing 102 and a second tensioner housing 104. The bracket 100 is directly and fixedly attached to the rear end 34. The bracket 100 is disposed on a first (left) side of the cover 56 with the first tensioner housing 102 fixed thereto. The first tensioner housing 102 and the second tensioner housing 104 are non-rotatably fixed to the cover 56, which will be discussed later.

Figure 10:
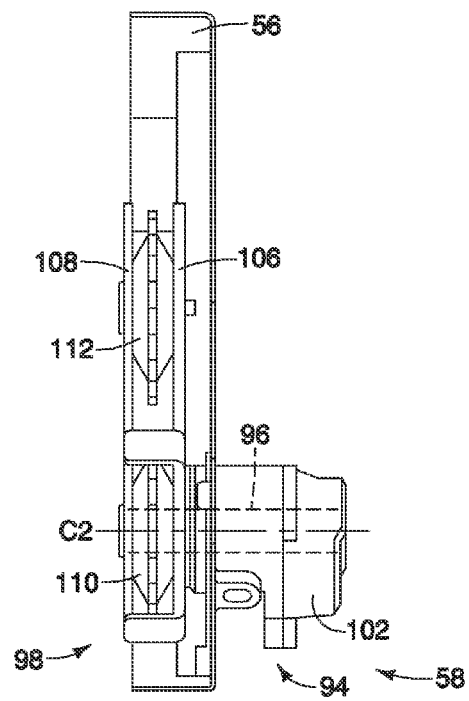
FIG. 10 is a partial elevational front view of the bicycle drive assembly illustrated in FIGS. 5 to 7, illustrating the tensioner mounted to the cover.

As shown in FIGS. 9 and 10, the support axle 96 extends from the frame mounting part 94. In particular, in the engagement position, the support axle 96 extends through the pulley axle opening 78 from the first tensioner housing 102. The support axle 96 is rotatably coupled to the first tensioner housing 102. The support axle 96 includes a center longitudinal axis that defines a second center rotational axis C2 of a guide pulley 110, which is also a pivot axis of the engaging part 98.

As seen in FIGS. 6, 9 and 10, the engaging part 98 is mounted on the support axle 96. In particular, the engaging part 98 is mounted to the frame mounting part 94 by the support axle 96 such that the engaging part 98 can pivot relative to the frame mounting part 94 on the support axle 96. A biasing arrangement (not shown) is operatively arranged between the frame mounting part 94 and the engaging part 98 in a conventional manner such that the engaging part 98 is biased in a counter-clockwise direction about the second center rotational axis C2 as viewed in FIG. 6.

As mainly shown in FIGS. 5 and 10, the engaging part 98 preferably has an outer cage plate 106, an inner cage plate 108, the guide pulley 110 and a tension pulley 112. The outer cage plate 106 and the inner cage plate 108 are located on opposite axial sides of the guide pulley 110 and the tension pulley 112 to guide the first driving member 18 onto the guide pulley 110 and the tension pulley 112. Each of the guide pulley 110 and the tension pulley 112 includes a plurality of chain engagement teeth for engaging the first driving member 18. The guide pulley 110 and the tension pulley 112 are rotatably mounted between the outer cage plate 106 and the inner cage plate 108. The guide pulley 110 and the tension pulley 112 are conventional driving member engaging elements, and thus, it will not be discussed and/or illustrated in detail herein.

Referring back to FIGS. 7 and 9, the cover 56 with the tensioner 58 fixedly coupled thereto will be discussed in more detail. The cover 56 is non-rotatably supported by the frame mounting part 94 of the tensioner 58. Moreover, the cover 56 is disposed between the bracket 100 and the first tensioner housing 102 (e.g., a member) of the frame mounting part 94 and the engaging part 98 with the support axle 96 extending through the pulley axle opening 90 in the cover 56. With this arrangement of the cover 56 and the tensioner 58, the engaging part 98 also can be covered by the cover 56.

As discussed above, the first tensioner housing 102 and the second tensioner housing 104 of the frame mounting part 94 are non-rotatably fixed to the cover 56. In particular, as best shown in FIG. 9, the second tensioner housing 104 basically has a main housing portion 114 and a flange 116 with a plurality (three) housing bores 118. The main housing portion 114 is fitted into the pulley axle opening 90 from an inner (right) side of the cover 56 with the flange 116 being attached to an inner (right) side of the tensioner covering portion 72. The main housing portion 114 has a housing opening 120 which is coupled to from the outer (left) side of the tensioner covering portion 72 by the first tensioner housing 102 with the support axle 96 mounted thereto. In the illustrated embodiment, the frame mounting part 94 is fastened to the cover 56 with a plurality (three) housing screws 122. The housing screws 122 extend through the second bores 92 disposed around the rear hub axle opening 76, respectively, and are threadedly coupled to the housing bores 118, respectively. Of course, it will be apparent from this disclosure that the frame mounting part 94 can have other configurations as needed and/or desired so long the frame mounting part 94 non-rotatably supports the cover 56, the frame mounting part 94 supports rotatably the support axle 96, and the engaging part 98 pivots relative to the frame mounting part 94 on the support axle 96.

In this embodiment illustrated above, the cover 56 is non-rotatably supported by the frame mounting part 94. However, alternatively, the cover 56 can be fixedly and directly attached to the rear fork 30 or the chain stay 32 with, for example, a fixing band. In this arrangement, there can be no need to provide the bearing 82 to support the cover 56 on the rear hub axle 60.

Moreover, in this embodiment illustrated above, the first driving member 18 and the second driving member 22 are chains formed of metallic material. However, alternatively, the first driving member 18 and/or the second driving member 22 can be a belt formed of materials including plastic, rubber and the like. In this arrangement, the drive sprocket 38, the front sprocket 48, the first rear sprocket 64, and/or the second rear sprocket 66 can be a belt sprocket.

In this embodiment illustrated above, the motor 16 is mounted on the main flame body 28. However, alternatively, the motor 16 can be mounted on the crank axle 42.

In this embodiment illustrated above, the motor drive train is disposed on the first (left) lateral side of the bicycle frame 14, and the manual drive train is disposed on the second (right) lateral side of the bicycle frame 14. However, this arrangement can be reversed if needed and/or desired. For example, the motor drive train can be disposed on the second (right) lateral side of the bicycle frame 14, and the manual drive train can be disposed on the first (left) lateral side of the bicycle frame 14.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While only a preferred embodiment has been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as they do not substantially their intended function. Components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiment according to the present invention are provided for illustration only, and not for the purpose of limiting the invention as defined by the appended claims and their equivalents.

What is claimed is:

1. A bicycle drive assembly comprising:
   a rear hub including
      a rear hub axle configured to be mounted to rear ends of a rear fork of a bicycle frame, a hub shell rotatably mounted on the rear hub axle and configured to be disposed between the rear ends of the rear fork, a first rear sprocket rotatably mounted on a first side of the rear hub axle relative to the hub shell, and a disc brake rotor rotatably mounted on the first side of the rear hub axle relative to the hub shell; and a cover disposed around the rear hub axle and axially between the first rear sprocket and the disc brake rotor.

2. The bicycle drive assembly according to claim 1, wherein
the cover is supported on the rear hub axle by a bearing.

3. The bicycle drive assembly according to claim 1, further comprising
a tensioner configured and disposed on a first side of the rear hub,
the tensioner including
a frame mounting part configured to be fixed to a bicycle frame,
a support axle extending from the frame mounting part, and
an engaging part mounted on the support axle.

4. The bicycle drive assembly according to claim 3, wherein
the first rear sprocket is driven by a motor.

5. The bicycle drive assembly according to claim 1, further comprising
a tensioner arranged on the first side of the rear hub axle relative to the hub shell, wherein the cover is disposed between the tensioner and the brake rotor.

6. The bicycle drive assembly according to claim 1, wherein
the cover includes an outer peripheral portion configured to at least partially cover the first rear sprocket from at least upper, lower, and rearward sides of the first rear sprocket.

7. A bicycle drive assembly comprising:
a rear hub including
a rear hub axle,
a hub shell rotatably mounted on the rear hub axle,
a first rear sprocket rotatably mounted on a first side of the rear hub axle,
a second rear sprocket rotatably mounted on a second side of the rear hub axle, the second side corresponding to an opposite side of the hub shell as the first side with respect to an axial direction of the rear hub,
a disc brake rotor rotatably mounted on the first side of the rear hub axle; and
a cover disposed around the rear hub axle and axially between the first rear sprocket and the disc brake rotor.

8. The bicycle drive assembly according to claim 7, wherein
one of the first and second rear sprockets is configured to be driven by a motor.

9. A bicycle drive assembly comprising:
a rear hub including
a rear hub axle,
a hub shell rotatably mounted on the rear hub axle,
a first rear sprocket rotatably mounted on a first side of the rear hub axle,
a disc brake rotor rotatably mounted on the first side of the rear hub axle; and
a cover disposed around the rear hub axle and axially between the first rear sprocket and the disc brake rotor, the cover being configured to be non-rotatably supported on a bicycle frame.

10. A bicycle drive assembly comprising:
a rear hub including
a rear hub axle,
a hub shell rotatably mounted on the rear hub axle,
a first rear sprocket rotatably mounted on a first side of the rear hub axle, and
a disc brake rotor rotatably mounted on the first side of the rear hub axle;
a tensioner configured and disposed on a first side of the rear hub, the tensioner including
a frame mounting part configured to be fixed to a bicycle frame,
a support axle extending from the frame mounting part, and
an engaging part mounted on the support axle; and
a cover disposed around the rear hub axle and axially between the first rear sprocket and the disc brake rotor, the cover being non-rotatably supported by the frame mounting part of the tensioner.

11. The bicycle drive assembly according to claim 10, wherein
the cover is disposed between a member of the frame mounting part and the engaging part with the support axle extending through an opening in the cover.

12. An electric assist bicycle, comprising:
a bicycle frame;
a rear hub, the rear hub including;
a rear hub axle non-rotatably mounted to the bicycle frame,
a hub shell rotatably mounted on the rear hub axle,
a first rear sprocket rotatably mounted on a first side of the rear hub axle, and
a second rear sprocket rotatably mounted on a second side of the rear hub axle,
the second side being opposite the first side;
a disc brake rotor rotatably mounted on the first side of the rear hub axle;
a cover disposed around the rear hub axle and axially between the first rear sprocket and the disc brake rotor,
an electric motor having an output shaft located on one of a first and second lateral sides of the bicycle frame, and a first drive sprocket mounted on the output shaft;
a first driving member operatively coupling the first drive sprocket and one of the first and second rear sprockets together;
a front crankset including a crank axle rotatably mounted to the bicycle frame, a pair of crank arms mounted on opposite ends of the crank axle, respectively, and a second drive sprocket fixedly coupled to the crank axle on other of the first and second lateral sides of the bicycle frame, the second drive sprocket being mounted on an opposite lateral side of the bicycle frame to the first drive sprocket; and
a second driving member operatively coupling the second drive sprocket and the other of the first and the second rear sprockets.

13. A bicycle drive assembly comprising:
a rear hub including
a rear hub axle having a first end and a second end,
a hub shell rotatably mounted on the rear hub axle between the first and second ends,
a first rear sprocket rotatably mounted on the rear hub axle between the hub shell and the first end of the rear hub axle, and
a disc brake rotor rotatably mounted on the rear hub axle between the first rear sprocket and the first end of the rear hub axle; and
a cover disposed around the rear hub axle and axially between the first rear sprocket and the disc brake rotor.

* * * * *